Dec. 14, 1926.

G. W. BRIDGES 1,610,922

SAW FILING MACHINE

Filed Dec. 19, 1925    2 Sheets-Sheet 1

Inventor
George W. Bridges.
By Adam E. Fisher.
Attorney

Dec. 14, 1926.
G. W. BRIDGES
1,610,922
SAW FILING MACHINE
Filed Dec. 19, 1925        2 Sheets-Sheet 2
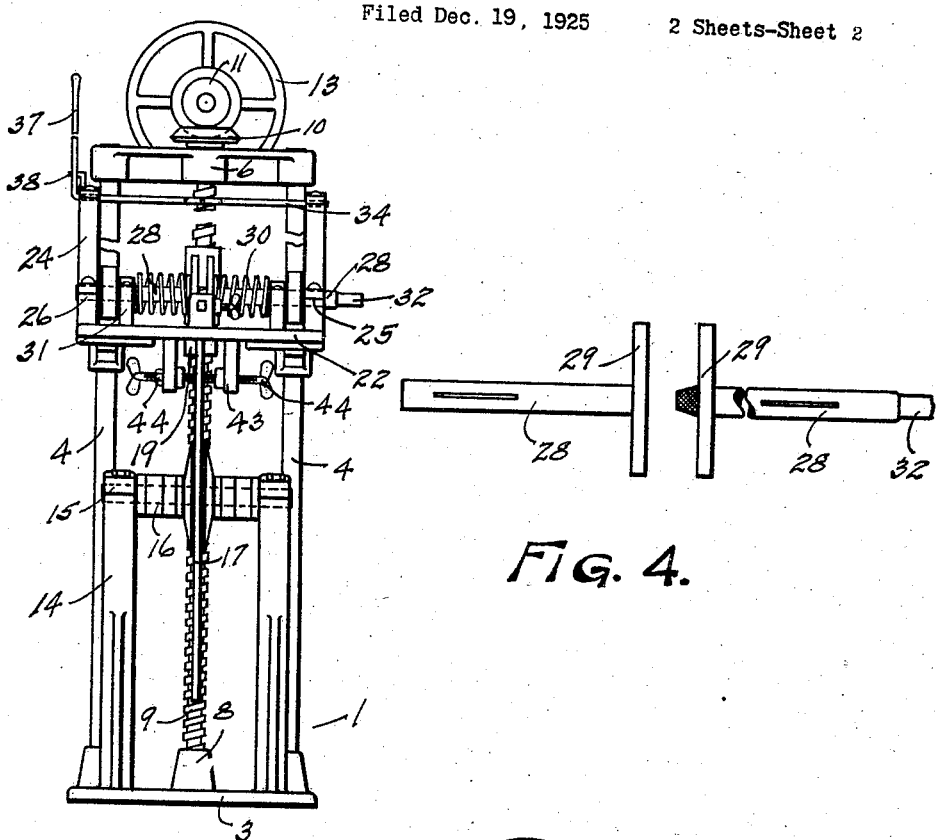
Fig. 2.
Fig. 4.
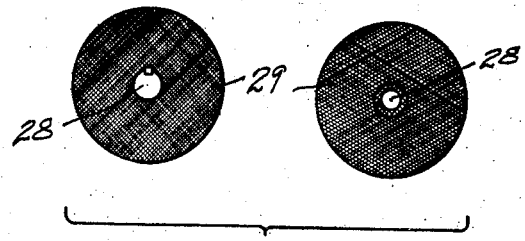
Fig. 5.
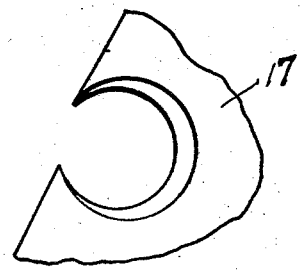
Fig. 6.
Inventor
George W. Bridges.
By Adam E. Fisher.
Attorney Patented Dec. 14, 1926.

1,610,922

UNITED STATES PATENT OFFICE.

GEORGE W. BRIDGES, OF MINDEN, LOUISIANA.

SAW-FILING MACHINE.

Application filed December 19, 1925. Serial No. 76,391.

This invention relates to saw filing machinery, especially that type of adjustable filling machinery which is adapted for use on circular saws, such as are used in saw mills, pattern shops, etc.

The primary object of this invention is to provide a filing machine which can be readily adjusted to file any size or shape of tooth in an efficient manner.

Another object is to provide a machine which is constructed in such a manner that both sides of the tooth will be filed at the same time.

Another object is to provide a machine wherein especially constructed circular files or carborundum wheels are utilized.

A further object is to provide adjustable means for rigidly holding the saw tooth to prevent springing the same out of alignment.

Other objects will be apparent from the accompanying drawings and specification.

In the drawings—

Figure 2 is a front view of the machine with a saw mounted therein;

Figure 4 is a detail of the file shafts;

Figure 5 is a detail of one of the sets of files;

Figure 6 is a detail of a portion of the saw when filed.

Figure 1:
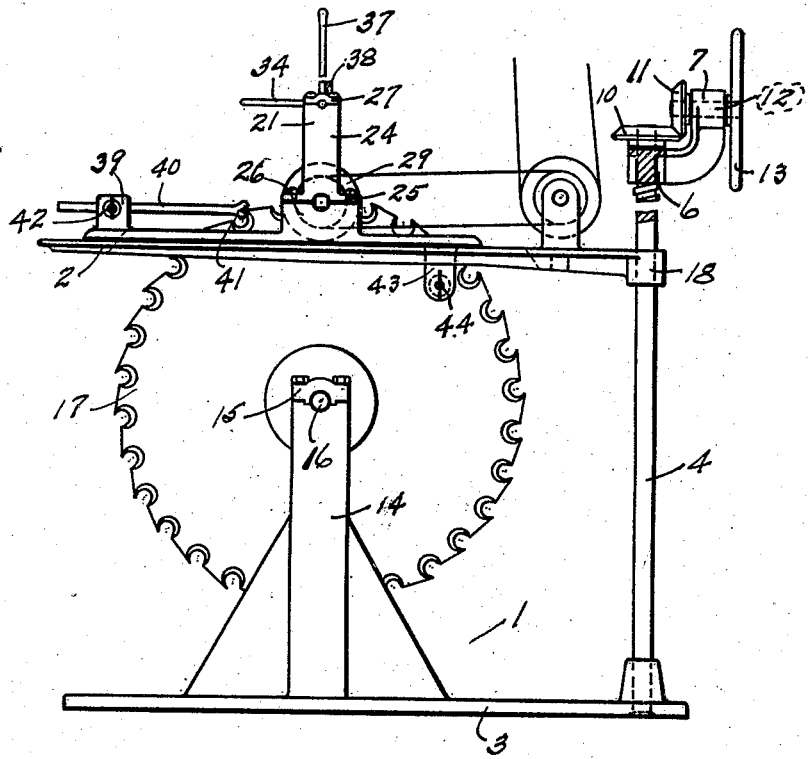
Figure 1 is a side elevation of the machine showing a saw mounted therein and ready for filing.
Figure 3:
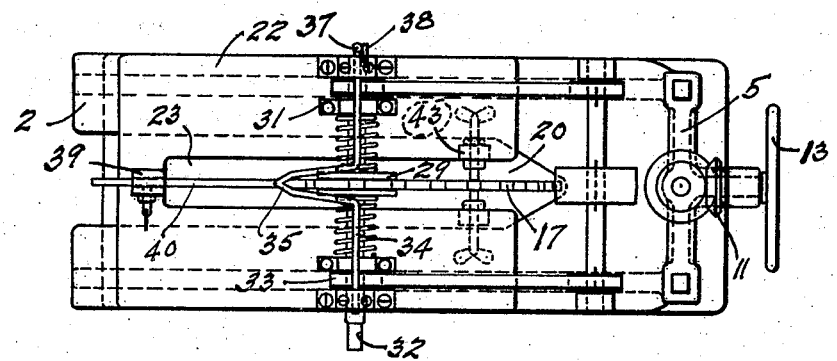
Figure 3 is a top view of the machine showing a saw therein ready for filing.

In carrying out this invention, I provide a frame 1 arranged with an adjustable table 2, which is to carry the elements of my invention. The said frame 1 comprises a base 3 having bars 4 vertically secured thereto. The said bars 4 have a brace 5 formed with medial bearings 6 and 7, secured to their upper ends. An end bearing 8 is secured to the base 3 medially between the vertical bars 4 and in perfect vertical alignment with the bearing 6 of the brace 5. The said bearing 6, which is a vertical bearing, has the upper end of an adjustment screw 9 journaled therein, while the end bearing 8 has the lower end of the said adjustment screw 9 journaled therein. A bevel gear 10 is secured to the upper end of the adjustment screw 9, and is adapted to mesh with a bevel gear 11 which is mounted upon a shaft 12. The said shaft 12 carries a hand wheel 13 upon its end opposite the beveled gear 11, and is journaled in the bracket bearing 7, thus facilitating the rotation of the screw 9 for adjusting the table 2. Bearing supports 14 carrying bearings 15 are mounted upon the base 3, so as to be perfectly aligned both longitudinally and vertically, so that when the mandrel 16, carrying the saw 17, is journaled therein, it will run perfectly true. The table 2, which carries the filing mechanism 21, is mounted upon the vertical bars 4 and the screw 9 by means of bearings 18 and a threaded socket 19. A slot 20 is cut in the center of the table 2 to permit the saw to pass therethrough for a purpose to be later explained.

The filing mechanism 21 comprises a frame 22 which is slotted in its central portion as shown at 23 and mounted upon the table 2 so that the said slots 20 and 23 are in perfect vertical alignment. Double bearing cases 24 are cast in the frame 22. The said double bearing cases 24 are split and releasably secured to each other as shown at 25 and have bearings 26 and 27 secured therein. File shafts 28 are journaled in the bearings 26 and have round files or carborundum wheels 29 key seated thereon. The said files are adapted to file the teeth of the saw 17 on both sides at the same time. For the sake of illustration, a specific size and shape of a set of files is shown in Figure 5 which are adapted to file the lower sides of the teeth hollow to provide special clearance as shown in Figure 6. It is evident, however, that any size or shape of file may be used to properly file the teeth of the various kinds and sizes of circular saws in use. Springs 30 are mounted on the file shaft 28 and engage the files 29 with one end and bearings 31 with the opposite end. The one end of a file shaft 28 may be squared as shown at 32 to permit securing a crank thereto, or pulleys 33 may be mounted thereon for rotating the said file shaft 28. The upper bearings 27 of the cases 24 have a rod 34 journaled therein. The said rod 34 is formed with a V offset 35 in line with the center of the frame 22, while the one end 36 is formed at an angle of 90 degrees to the V offset 35 into a hand lever 37. The lever 37 engages a stop 38, which holds the said lever in a vertical position. When the lever 37 is turned down into a horizontal position, the V offset 35 engages the files 29 and spreads the same. A bearing 39 is mounted upon the frame 22 in line with the saw 17 and has a forked rod 40 slidingly journaled therein. The said rod 40 is adapted to engage the points of the teeth of the saw 17 with its forked end 41 so as to hold the said teeth rigid and is releasably secured in the bearing 39 by means of a thumb screw 42. Screw lugs 43 are incorporated in the frame 22 opposite the bearing 39. Thumb set screws 44 threadedly engage and pass through the lugs 43 and engage the saw 17 to hold the said saw in a rigid position while filing the same. A lock nut 45 engages one of the set screws 44, to permit locking the same after the saw has been aligned to eliminate all danger of springing the said saw through misalignment during the course of filing.

In operation, the saw 17 is mounted upon and aligned on the mandrel 16, which is then journaled in the bearings 15, so that the said saw 17 passes through the aligned slot 20 of the table 2 and slot 23 of the frame 22. After the mandrel has been properly aligned so that the saw 17 runs true, the table 2 is adjusted to the proper height, and the said saw clamped between the set screws 44. The forked rod 40 is then adjusted to the tooth to be filed and secured in position by means of the thumb screw 42. After the aforementioned operations have been performed, the lever 37 is raised into a vertical position, thereby withdrawing the V offset 35 from between the files 29 and permitting them to engage the saw 17 through the pressure of the springs 30. The file shaft 28 may be rotated either by means of a crank or by power; in the event of the latter, however, a countershaft is employed. When it is desired to change files, the double bearing cases 24 are disassembled at 25 which is at the center of the bearing 26 to permit removing the file shafts 28. After the file shafts 28 have been removed, bearings 31 and springs 30 are taken off, whereupon the files 29 may be readily taken off and replaced by other files or carborundum wheels as desired.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a saw filing machine as described, the combination of a frame for mounting circular saws, said frame carrying an adjustable table, provided with a central saw slot; a filing frame on said adjustable table, said filing frame being provided with a central saw slot, in alignment with said saw slot in said adjustable table; a file shaft journaled to said filing frame; files slidingly mounted on said file shaft; stop plates on said file shaft; springs on said file shaft engaging said files and said stop plates to keep said files bearing against said saw while filing; a rod formed with a V offset and a lever, for spreading said files when through filing, said lever being formed at 45 degrees to said V offset; means for locking said saw in position; and means for rotating said file shaft.

2. In a saw filing machine, the combination of a frame for mounting circular saws, the said frame carrying an adjustable table, provided with a central saw slot; a filing frame on said adjustable table, the said filing frame being provided with a central saw slot, in alignment with said saw slot in said adjustable table; split bearing cases incorporated in said filing frame; bearings for said bearing cases; a file shaft in said bearings, said file shaft being key seated in its central portion; keys in said key seat; key seated circular files slidingly mounted on said key seated portion of said file shaft; stop plates on said file shaft; springs mounted on said file shaft engaging said files and said stop plates; means for rotating said file shaft; a rod journaled above said file shaft in said split bearing cases, said rod being formed with a V offset for spreading said files; a forked rod mounted on said filing frame parallel to said saw slots for engaging said circular saw; and set screws passed through said filing frame for locking said saw in position.

In testimony whereof I affix my signature.

GEORGE W. BRIDGES.